United States Patent
Moon et al.

(10) Patent No.: US 7,512,411 B2
(45) Date of Patent: Mar. 31, 2009

(54) RADIO COMMUNICATION SYSTEM, RADIO NETWORK CONTROLLER, MOBILE STATION AND DOWN LINK TRANSMISSION POWER CONTROL METHOD

(75) Inventors: Sung Uk Moon, Yokosuka (JP);
Takehiro Nakamura, Yokosuka (JP);
Akihito Hanaki, Yokohama (JP);
Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 633 days.

(21) Appl. No.: 10/776,279

(22) Filed: Feb. 12, 2004

(65) Prior Publication Data

US 2004/0162100 A1    Aug. 19, 2004

(30) Foreign Application Priority Data

Feb. 13, 2003   (JP) .............................. 2003-035740

(51) Int. Cl.
*H04B 7/00* (2006.01)
*H04Q 7/20* (2006.01)

(52) U.S. Cl. ........................................ 455/522; 455/69
(58) Field of Classification Search ................. 455/522, 455/69
See application file for complete search history.

(56) References Cited

U.S. PATENT DOCUMENTS

2003/0157952 A1* 8/2003 Sarkkinen et al. ........... 455/522

FOREIGN PATENT DOCUMENTS

| CN | 1491048 A | 4/2004 |
|----|-----------|--------|
| EP | 0 999 656 A1 | 5/2000 |
| EP | 1 143 635 A1 | 10/2001 |
| JP | 2000-138632 | 5/2000 |
| JP | 2003-188818 | 7/2003 |
| JP | 2005-535237 | 11/2005 |

* cited by examiner

Primary Examiner—Philip J Sobutka
(74) Attorney, Agent, or Firm—Oblon, Spivak, McClelland & Neustadt, P.C.

(57) ABSTRACT

The object of the present invention is to provide a radio communication system which can reduce control information transmitted from mobile stations to a base station, reduce traffic of up link radio resources, and suppress the quantity of interference to the entire radio communication system. The present invention relates to the radio communication system in which the same information is transmitted from a base station 30a to a plurality of mobile stations 40a to 40c with a predetermined down link transmission power. The base station includes transmission power controller configured to control the predetermined down link transmission power based on control information transmitted by a part of the mobile stations 40a to 40c subordinated to the base station 30a.

8 Claims, 8 Drawing Sheets

RADIO COMMUNICATION SYSTEM, RADIO NETWORK CONTROLLER, MOBILE STATION AND DOWN LINK TRANSMISSION POWER CONTROL METHOD

CROSS REFERENCE TO RELATED APPLICATIONS

This application is based upon and claims the benefit of priority from the prior Japanese Patent Applications NO. P2003-035740 filed on Feb. 13, 2003; the entire contents of which are incorporated herein by reference.

BACKGROUND OF THE INVENTION

1. Field of the Invention

The present invention relates to a radio communication system in which the same information is transmitted from a radio station to a plurality of mobile stations, and a radio station, a mobile station, and down link transmission power control method that are suitable for use in the radio communication system.

2. Description of the Related Art

Conventionally, as a technique for simultaneously transmitting the same information from a radio station such as a base station or a radio station to a plurality of mobile stations, there are techniques such as the broadcast communication and the multicast communication.

As shown in FIG. 1, the broadcast communication is a technique for simultaneously transmitting the same information from one or a plurality of base stations (11 to 17) to all mobile stations (101 to 112) located in areas of them (see, for example, 23.041 Technical realization of Cell Broadcast Service (CBS) written by 3rd Generation Partnership Project Technical Specification Group Terminals, August 2000). As shown in FIG. 2, the multicast communication is a technique for simultaneously transmitting the same information from one or a plurality of base stations (11 to 17) to mobile stations (101, 103, 105, 106, 108, 109 and 110) of a specific group located in areas of them (see, for example, 25.324 Broadcast/Multicast Control BMC, December 2000, written by 3rd Generation Partnership Project Technical Specification Group Radio Access Network, December 2000).

Furthermore, as a technique whereby the radio station controls a predetermined down link transmission power in the conventional radio communication system when the same information is transmitted from the radio station to a plurality of mobile stations with the predetermined down link transmission power, there is a technique whereby the radio station controls a predetermined down link transmission power based on reception quality (such as received power, a ratio (SIR) of the same information of the received power to interference power, and an error bit rate of the same information) calculated by the mobile stations (see, for example, Japanese Patent Application Laid-Open Publication No. 2001-292096).

In the case where a radio station such as a base station or a radio network controller controls a predetermined down link transmission power in the conventional radio communication system, the radio station requests all subordinate mobile stations to transmit control information (such as the reception quality). Even if it is not necessary to control the predetermined down link transmission power because a mobile station is located near the radio station, the mobile station transmits the control information to the radio station. Therefore, there is a problem that control information that does not contribute to control of the predetermined down link transmission power increases and the traffic of up link radio resources increases.

BRIEF SUMMARY OF THE INVENTION

In viewing of the foregoing, it is an object of the present invention to provide a radio communication system which can reduce the control information transmitted from mobile stations to a radio station, reduce the traffic of up link radio resources, and suppress the quantity of interference to the entire radio communication system, and provide a radio station, a mobile station and a down link transmission power control method which can be used in the above radio communication system.

A first aspect of the present invention is summarized as a radio communication system in which the same information is transmitted from a radio station to a plurality of mobile stations with a predetermined down link transmission power.

The radio station has a transmission power controller configured to control the predetermined down link transmission power based on control information transmitted by a part of the mobile stations subordinated to the radio station.

A second aspect of the present invention is summarized as a radio communication system in which the same information is transmitted from a radio station to a plurality of mobile stations with a predetermined down link transmission power.

The radio station has a transmission power controller configured to control the predetermined down link transmission power based on control information transmitted by the mobile stations.

The mobile station has a decision unit configured to decide whether to transmit the control information to the radio station, and a transmitter configured to transmit the control information to the radio station based on a result of the decision made by the decision unit. The control information is generated according to reception quality of the same information transmitted by the radio station.

A third aspect of the present invention is summarized as a radio communication system in which the same information is transmitted from a radio station to a plurality of mobile stations with a predetermined down link transmission power.

The radio station has a threshold setting unit configured to set a threshold for reception quality, a transmitter configured to transmit the threshold for the reception quality set by the threshold setting unit and the same information to the mobile stations, and a transmission power controller configured to control the predetermined down link transmission power based on control information transmitted by the mobile stations.

The mobile station has a reception quality calculator configured to calculate the reception quality of the same information transmitted by the radio station, a decision unit configured to decide whether to transmit the control information to the radio station by comparing the reception quality calculated by the reception quality calculator with the threshold for the reception quality transmitted by the radio station, and a transmitter configured to transmit the control information to the radio station based on a result of the decision made by the decision unit.

A fourth aspect of the present invention is summarized as a radio communication system in which the same information is transmitted from a radio station to a plurality of mobile stations with a predetermined down link transmission power.

The radio station has a mobile station selector configured to select a mobile station to which a transmission request for control information is transmitted, a transmission request transmitter configured to transmit the transmission request to the mobile station selected by the mobile station selector, and a transmission power controller configured to control the predetermined down link transmission power based on the control information transmitted by the mobile station that has been selected by the mobile station selector.

The mobile station has a transmitter configured to transmit the control information to the radio station based on the transmission request transmitted by the radio station.

DETAILED DESCRIPTION OF THE INVENTION

>A Configuration of Radio Communication System According to a First Embodiment of the Present Invention>

Figure 1:
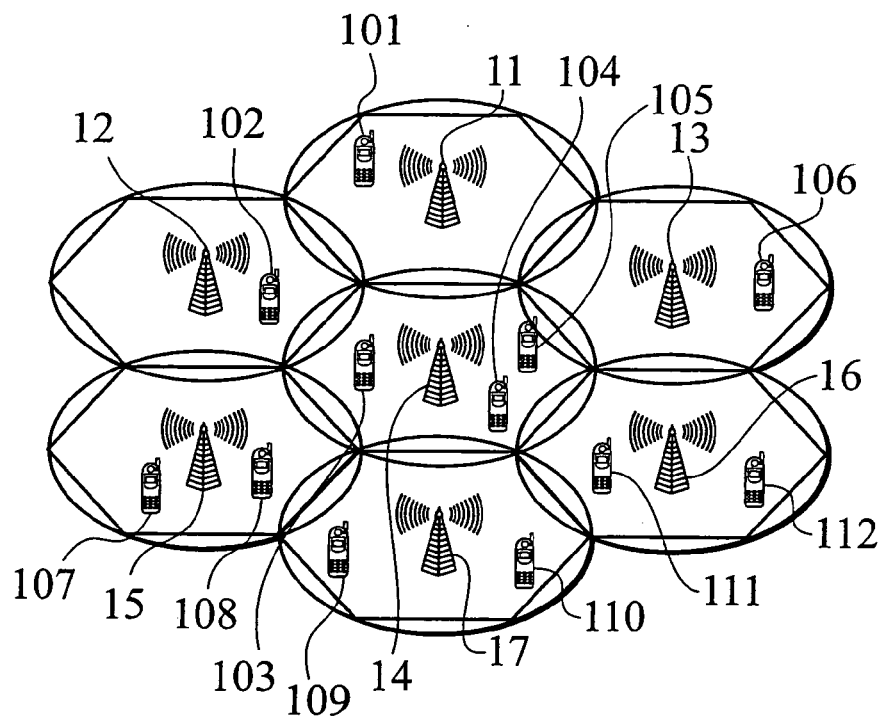
FIG. 1 is a diagram showing broadcast communication according to the prior art.
Figure 2:
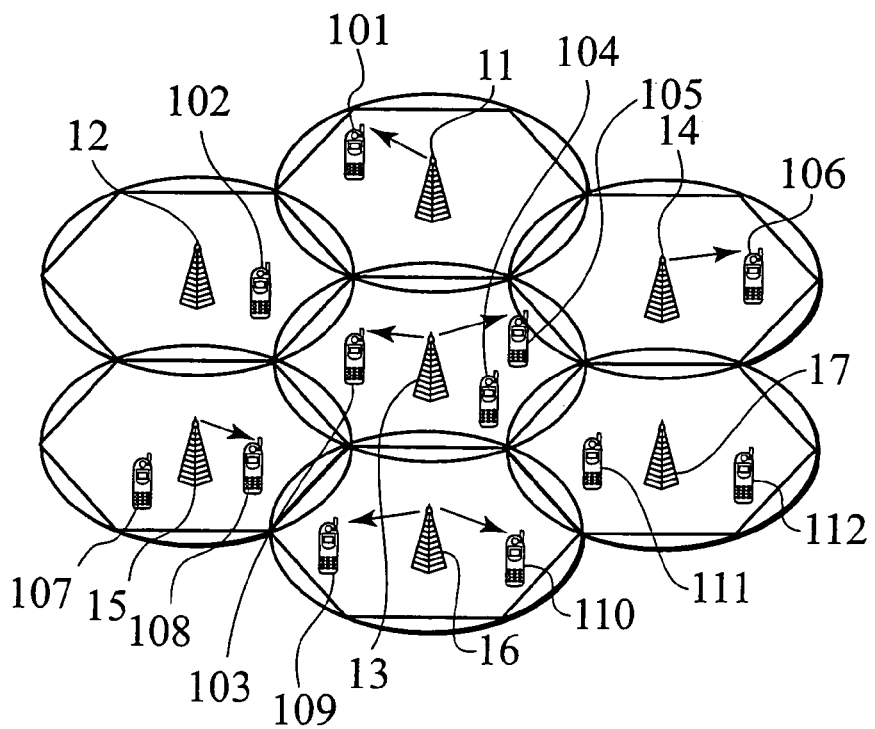
FIG. 2 is a diagram showing multicast communication according to the prior art.
Figure 3:
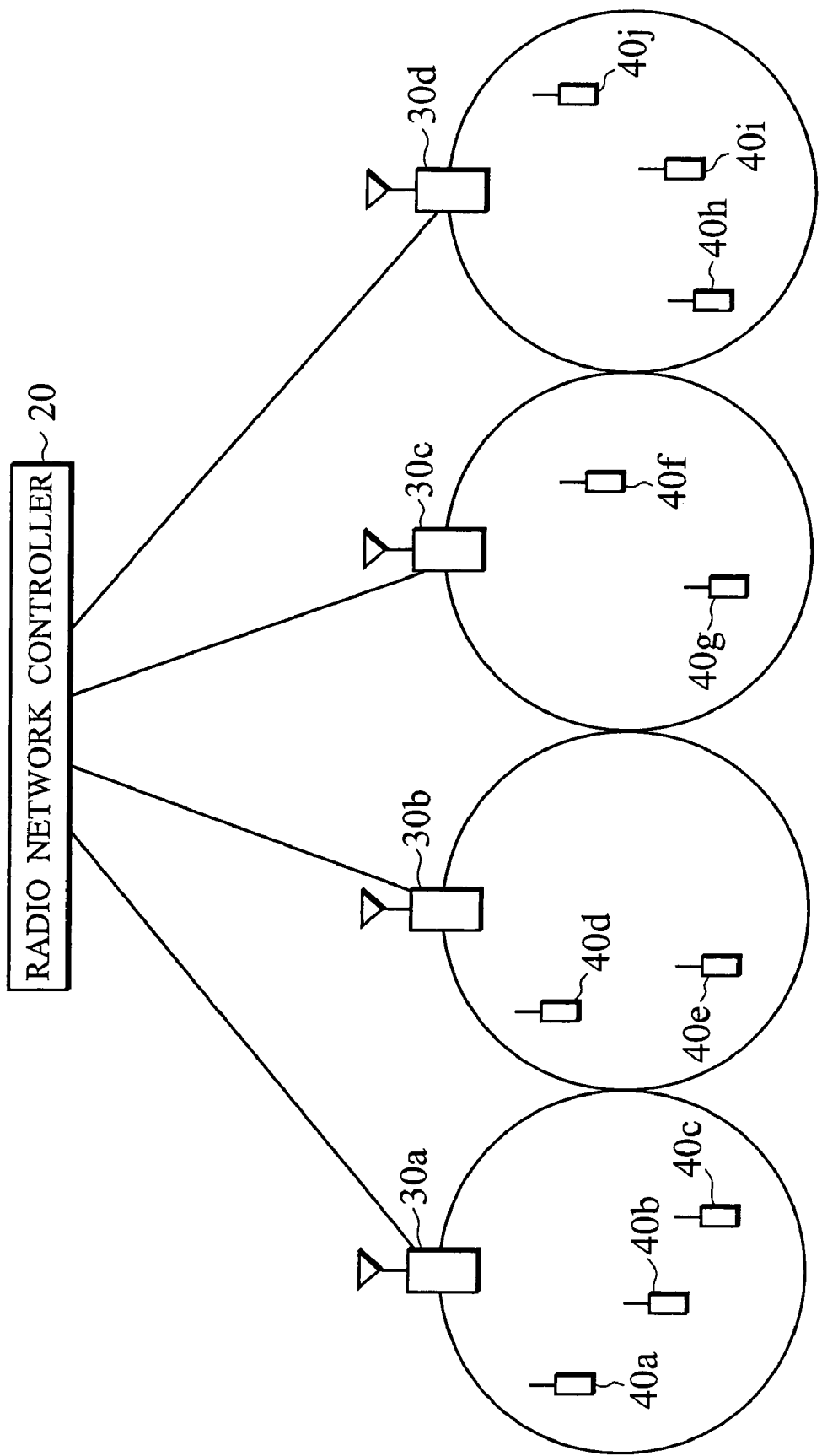
FIG. 3 is a diagram showing the entire configuration of a radio communication system according to the first embodiment.

Hereafter, a configuration of a radio communication system in a embodiment will be described with reference to drawing. FIG. 3 is a diagram showing the entire configuration of a radio communication system in the first embodiment. As shown in FIG. 3, the radio communication system in the embodiment includes a radio network controller 20, a plurality of base stations (30a to 30d), and a plurality of mobile stations (40a to 40j).

The radio network controller 20 transmits the same information to a plurality of mobile stations (40a to 40j) via a plurality of base stations (30a to 30d) (for example, the multicast communication or the broad band communication). In the present embodiment, the radio network controller 20 and the base stations (30a to 30d) are concrete examples of a radio station.

The base stations (30a to 30d) have the same function. The mobile stations (40a to 40j) have the same function. In the ensuing description, the base station 30a and the mobile station 40a will be taken as an example. The radio network controller 20 may have the function of the base station 30a.

Figure 4:
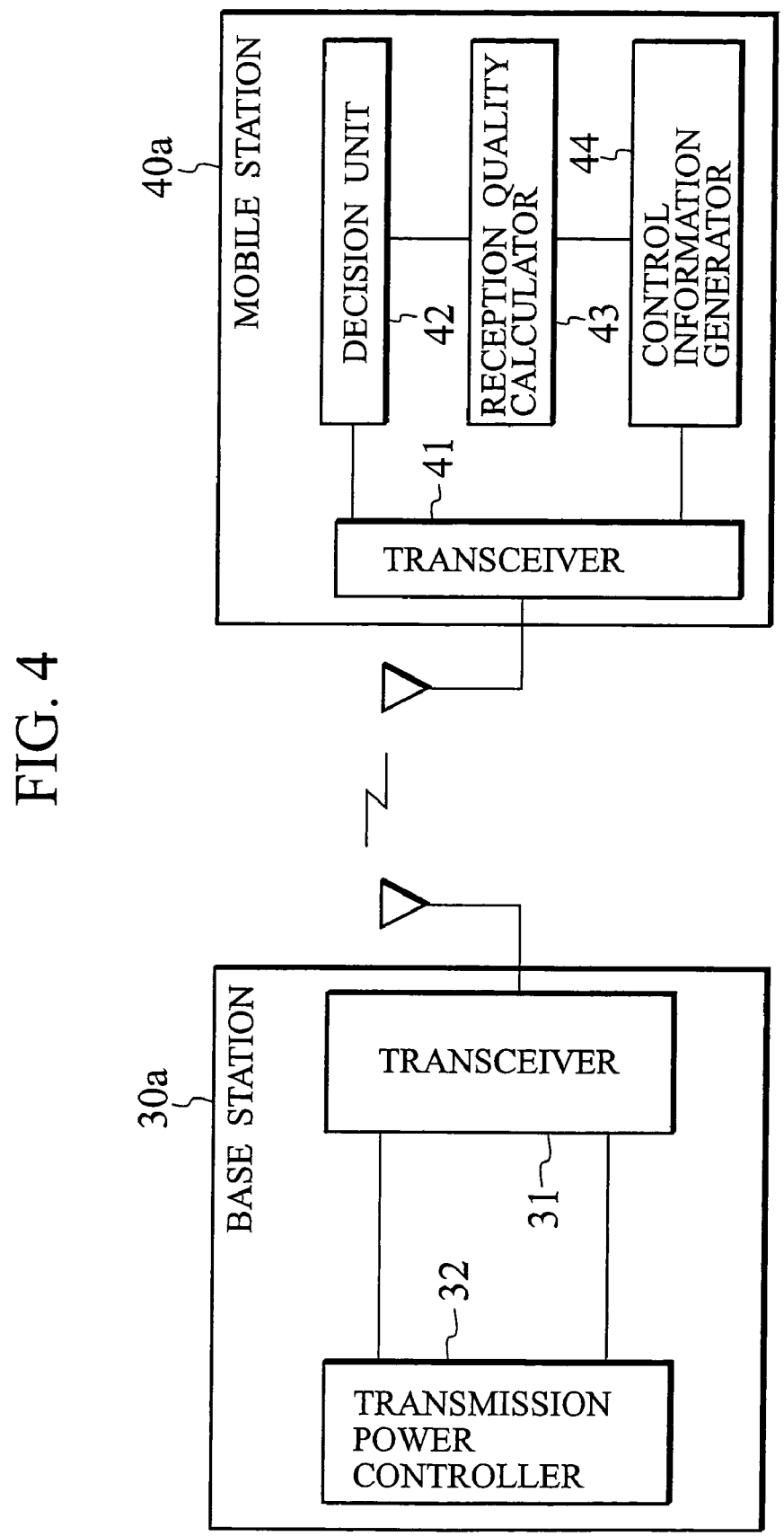
FIG. 4 is a functional block diagram of a base station and a mobile station in the radio communication system according to the first embodiment.

FIG. 4 is a functional block diagram of the base station 30a and the mobile station 40a in the radio communication system according to the first embodiment. As shown in FIG. 4, the base station 30a includes a transceiver 31 and a transmission power controller 32.

The transceiver 31 transmits the same information to the mobile station 40a with a predetermined down link transmission power, and receives control information transmitted by the mobile station 40a. The transmission power controller 32 is transmission power controller configured to control a predetermined down link transmission power based on the control information transmitted by the mobile station 40a.

Specifically, the transmission power controller 32 controls the predetermined down link transmission power based on control information selected according to a predetermined criterion from among a plurality of pieces of control information transmitted by a plurality of mobile stations. For example, the control information selected according to the predetermined criterion is control information for ordering that the predetermined down link transmission power should be controlled so as to become equal to the greatest down link transmission power or control information for ordering that the predetermined down link transmission power should be controlled so as to become equal to the second greatest down link transmission power.

For example, it is supposed that control information pieces transmitted by a plurality of mobile stations are "control information a" for ordering that the predetermined down link transmission power should be raised by 10 dBm, "control information b" for ordering that the predetermined down link transmission power should be raised by 5 dBm, and "control information c" for ordering that the predetermined down link transmission power should be raised by 3 dBm. It is also supposed that the transmission power controller 32 controls the predetermined down link transmission power based on the control information for ordering that the predetermined down link transmission power should be controlled so as to become the greatest down link transmission power. In this case, the transmission power controller 32 controls the predetermined down link transmission power based on "control information A" requesting for the first greatest down link transmission power.

In the case where the transmission power controller 32 controls the predetermined down link transmission power based on the control information for ordering that the predetermined down link transmission power should be controlled so as to become the second greatest down link transmission power, the transmission power controller 32 controls the predetermined down link transmission power based on "control information b" requesting for the second greatest down link transmission power.

In the case where all control information pieces transmitted by the plurality of mobile stations are control information for ordering that the predetermined down link transmission power should be lowered, the transmission power controller 32 may control so as to lower the predetermined down link transmission power.

For example, in the case where control information transmitted from each of the mobile stations is "control information d" for ordering that the predetermined down link transmission power should be lowered by 10 dBm, "control information e" for ordering that the predetermined down link transmission power should be lowered by 5 dBm, or "control information f" for ordering that the predetermined down link transmission power should be lowered by 3 dBm, the transmission power controller 32 lowers the down link transmission power by a predetermined power (such as 1 dBm or 3 dBm).

In the case where at least one control information for ordering that the predetermined down link transmission power should be raised is included in control information pieces transmitted by mobile stations, the transmission power controller 32 may control so as to raise the predetermined down link transmission power.

For example, in the case where control information transmitted from each of the mobile stations is "control information g" for ordering that the predetermined down link transmission power should be lowered by 10 dBm, "control information h" for ordering that the predetermined down link transmission power should be lowered by 5 dBm, or "control information i" for ordering that the predetermined down link transmission power should be raised by 3 dBm, the transmission power controller 32 raises the down link transmission power by a predetermined power (such as 1 dBm or 3 dBm).

The transmission power controller 32 may count control information pieces for ordering that the predetermined down link transmission power should be raised or control information pieces for ordering that the predetermined down link transmission power should be lowered, included in control information pieces transmitted by the mobile stations, and control the predetermined down link transmission power based on a result of the counting.

For example, in the case where three or more control information pieces for ordering that the predetermined down link transmission power should be raised are included in control information pieces transmitted by mobile stations, the transmission power controller 32 raises the down link transmission power by a predetermined power (such as 1 dBm or 3 dBm). In the case where two or more control information pieces for ordering that the predetermined down link transmission power should be lowered are included in control information pieces transmitted by mobile stations, the transmission power controller 32 lowers the down link transmission power by a predetermined power (such as 1 dBm or 3 dBm).

The mobile station 40a includes a transceiver 41, a decision unit 42, a reception quality calculator 43 and a control information generator 44.

The transceiver 41 receives the same information transmitted by the base station 30a, and transmits control information to the base station 30a.

The decision unit 42 is decision unit for deciding whether to transmit control information to the base station 30a. Specifically, the decision unit 42 decides to transmit control information to the base station 30a at a predetermined frequency (such as once every twice, or once every three times) when a plurality of the same information pieces is received by the transceiver 41. Furthermore, the decision unit 42 may decide at random whether to transmit the control information to the base station 30a.

The reception quality calculator 43 is reception quality calculator for calculating the reception quality of the same information received by the transceiver 41 based on a result of the decision made by the decision unit 42. The reception quality calculator 43 may always calculate the reception quality of the same information received by the transceiver 41. For example, the reception quality is received power of the same information, a ratio (SIR) of the received power to interference power, and an error bit rate of the same information.

The control information generator 44 generates control information based on the reception quality calculated by the reception quality calculator 43. For example, the control information is information for ordering that the down link transmission power should be raised by 10 dBm, information for ordering that the down link transmission power should be lowered by 5 dBm, a difference between the reception quality calculated by the reception quality calculator 43 and a desired reception quality, or the like. In the case where the base station 30a can control the down link transmission power based on the reception quality calculated by the reception quality calculator 43, the control information may be the reception quality itself.

In the embodiment, the transceiver 41 and the control information generator 44 form transmitter.

<An Operation of the Radio Communication System According to the First Embodiment>

Figure 5:
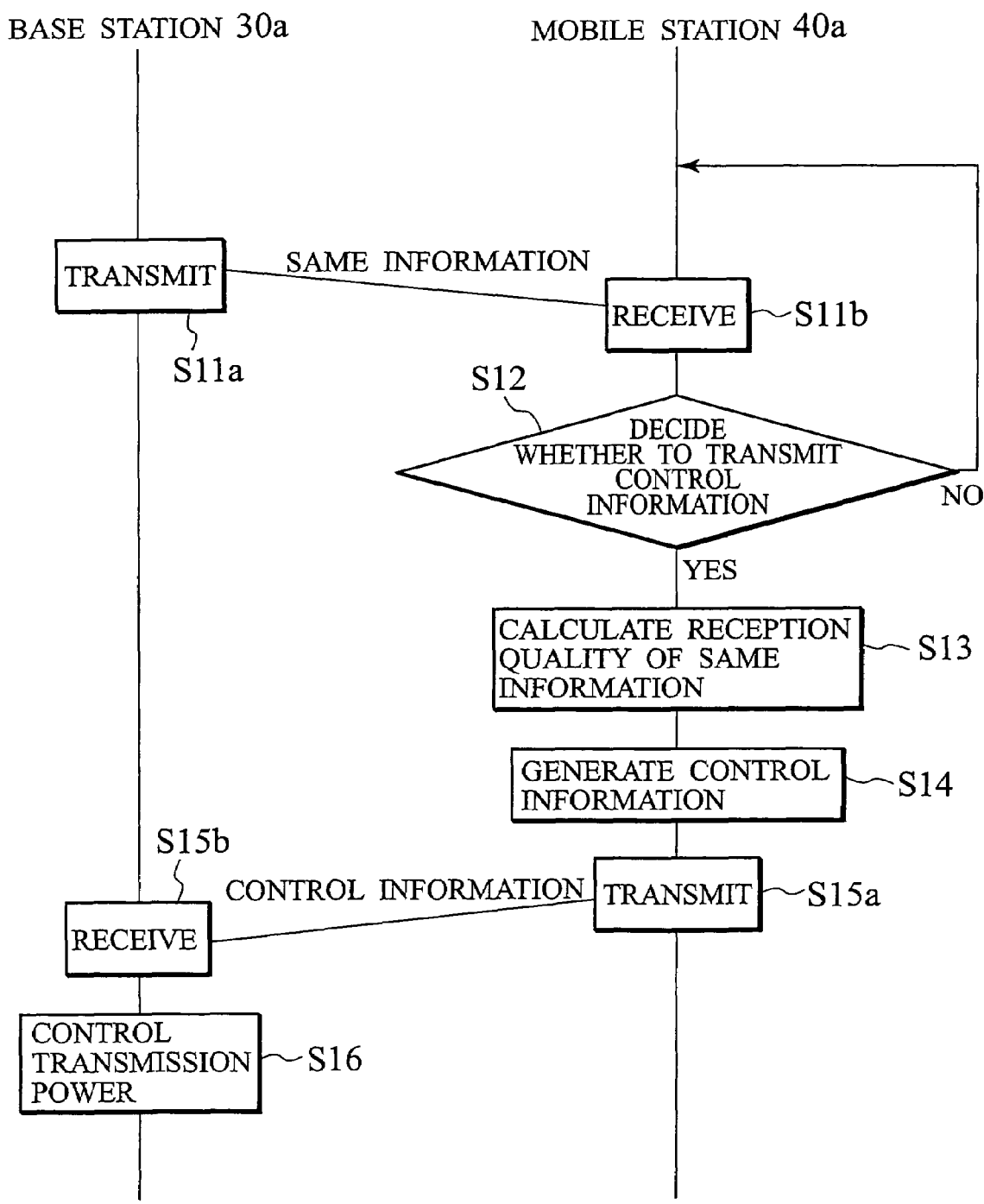
FIG. 5 is a sequence diagram illustrating an operation of a base station and a mobile station in the radio communication system according to the first embodiment.

Hereafter, operations of the base station and the mobile station in the radio communication system in the first embodiment will be described with reference to drawing. FIG. 5 is a sequence diagram illustrating the operation of the radio communication system in the first embodiment.

As shown in FIG. 5, in step 11a, the base station 30a transmits the same information to the mobile station 40a. In step 11b, the mobile station 40a receives the same information from the base station 30a.

In step 12, the mobile station 40a decides whether to transmit control information to the base station 30a. Specifically, the mobile station 40a decides to transmit the control information to the base station 30a at a predetermined frequency (such as once every twice, or once every three times), when a plurality of the same information pieces is transmitted by the base station 30a. Furthermore, the mobile station 40a may decide at random whether to transmit the control information to the base station 30a.

If the mobile station 40a decides to transmit the control information to the base station 30a, the mobile station 40a proceeds to step 13. If the mobile station 40a decides not to transmit the control information to the base station 30a, the mobile station 40a waits for the reception of the same information transmitted by the base station 30a.

In step 13, the mobile station 40a calculates the reception quality of the same information received in step 11b, based on a result of the decision made in step 12.

In step 14, the mobile station 40a generates control information based on the reception quality calculated in step 13.

In step 15a, the mobile station 40a transmits the control information generated in step 14 to the base station 30a. In step 15b, the base station 30a receives the control information from the mobile station 40a.

In step S16, the base station 30a controls down link transmission power based on the control information received in step 15b.

<Functions and Effects of the Radio Communication System according to the First Embodiment)

According to the radio communication system in the first embodiment, the mobile station 40a transmits the control information to the base station 30a only at the predetermined frequency. Therefore, as compared with the case where control information is transmitted every time, it is possible to reduce control information transmitted from the mobile station 40a to the base station 30a, reduce the traffic of up link radio resources, and suppress the quantity of interference to the entire radio communication system.

<A Configuration of a Radio Communication System according to a Second Embodiment>

Configurations of the base station and the mobile station in the radio communication system in a second embodiment will be described with reference to drawing. Here after, only points different from the first embodiment will be described.

Figure 6:
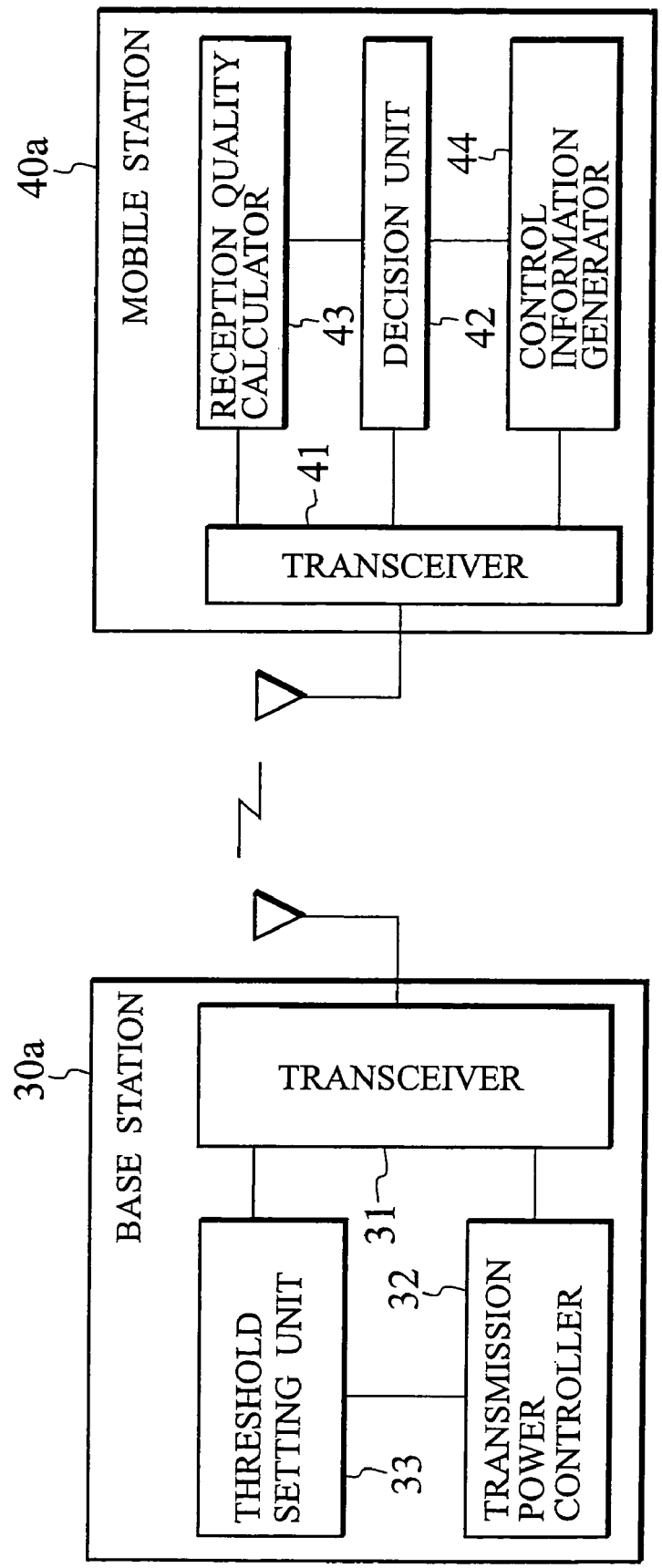
FIG. 6 is a functional block diagram of a base station and a mobile station in the radio communication system according to the second embodiment.

FIG. 6 is a functional block diagram of a base station and a mobile station in the second embodiment. As shown in FIG. 6, the base station 30a includes a transceiver 31, a transmission power controller 32, and a threshold setting unit 33. The mobile station 40a includes a transceiver 41, a decision unit 42, a reception quality calculator 43 and a control information generator 44.

The threshold setting unit 33 included in the base station 30a sets a threshold for the reception quality.

The transceiver 31 included in the base station 30a is transmitter for transmitting the threshold for the reception quality set by the threshold setting unit 33 and the same information to the mobile station 40a.

The decision unit 42 included in the mobile station 40a compares reception quality calculated by the reception quality calculator 43 with the threshold for the reception quality transmitted by the base station 30a and decides whether to transmit control information to the base station 30a.

The case where the reception quality is received power and the threshold for the received power is set equal to 10 dBm or less will be described. Specifically, the decision unit 42 decides to transmit the control information to the base station 30a when the received power of the same information calculated by the reception quality calculator 43 is 5 dBm (10 dBm or less). The decision unit 42 decides not to transmit the control information to the base station 30a when the received power of the same information calculated by the reception quality calculator 43 is 15 dBm (greater than 10 dBm).

<An Operation of the Radio Communication System according to the Second Embodiment>

Figure 7:
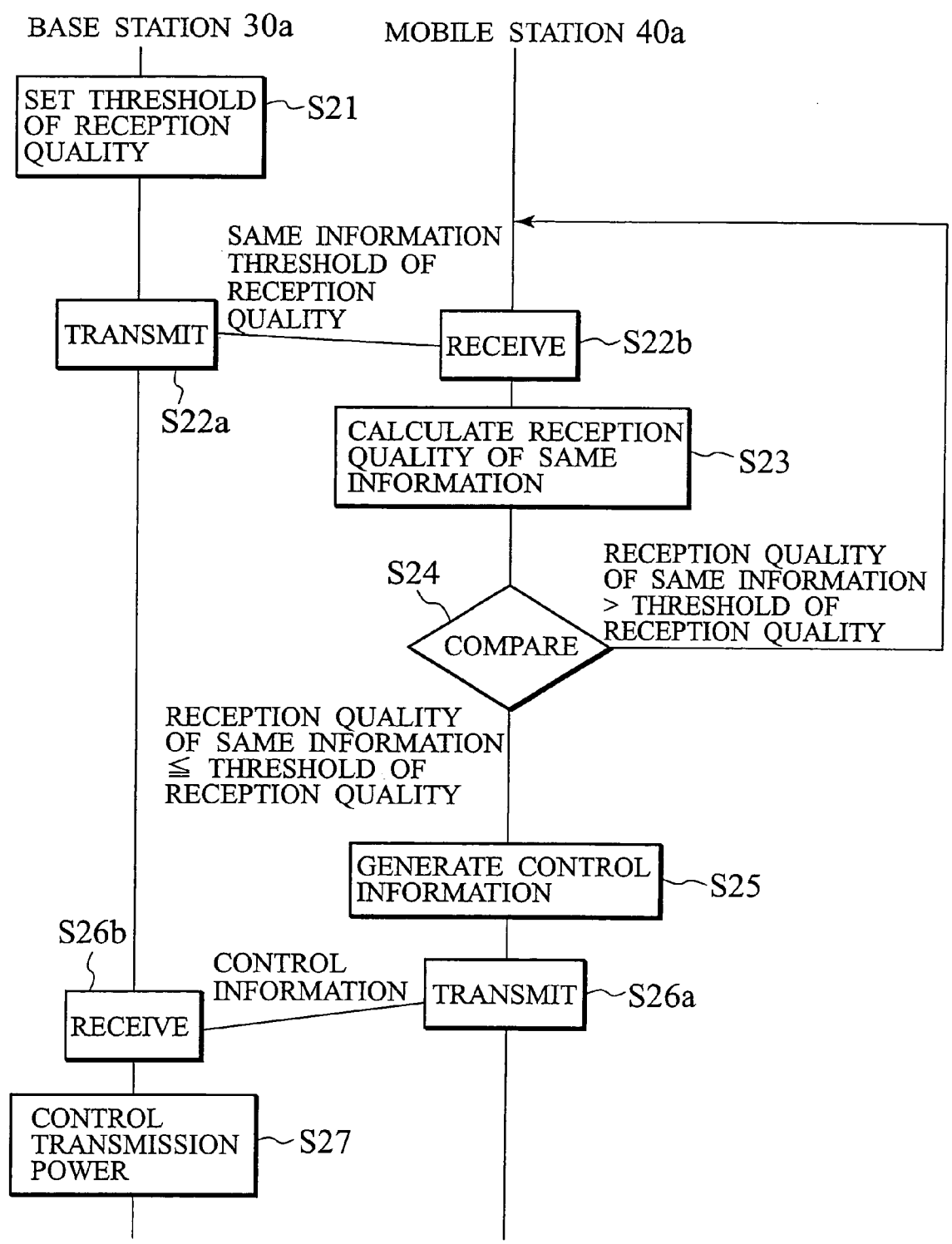
FIG. 7 is a sequence diagram illustrating an operation of a base station and a mobile station in the radio communication system according to the second embodiment.

Operations of the base station and the mobile station in the radio communication system in the second embodiment will be described with reference to drawing. FIG. 7 is a sequence diagram illustrating the operation of the radio communication system in the second embodiment.

As shown in FIG. 7, in step 21, the base station 30a sets a threshold for the reception quality.

In step 22a, the base station 30a transmits the threshold for the reception quality set in step 21 and the same information to the mobile station 40a. In step 22b, the mobile station 40a receives the threshold for the reception quality and the same information from the base station 30a.

In step 23, the mobile station 40a calculates the reception quality of the same information received in step 22b.

In step 24, the mobile station 40a decides whether to transmit control information to the base station 30a by comparing the threshold for the reception quality received in step 22b with the reception quality of the same information calculated in step 23.

The case where the reception quality is received power and the threshold for the received power is set equal to 10 dBm or less will be described in below. Specifically, the mobile station 40a decides to transmit the control information to the base station 30a when the received power of the same information calculated at step S23 is 5 dBm (10 dBm or less). The mobile station 40a decides not to transmit the control information to the base station 30a when the received power of the same information calculated at step S23 is 15 dBm (greater than 10 dBm).

If the mobile station 40a decides to transmit the control information to the base station 30a, the mobile station 40a proceeds to step 25. If the mobile station 40a decides not to transmit the control information to the base station 30a, the mobile station 40a waits for the reception of the same information and the threshold for the reception quality transmitted by the base station 30a.

In step 25, the mobile station 40a generates control information based on the reception quality of the same information calculated in step 23.

In step 26a, the mobile station 40a transmits the control information generated in step 25 to the base station 30a. In step 26b, the base station 30a receives the control information from the mobile station 40a.

In step 27, the base station 30a controls down link transmission power based on the control information received in step 26b.

<Functions and Effects of the Radio Communication System according to the Second Embodiment>

According to the radio communication system in the second embodiment, the control information is not transmitted to the base station 30a, when the reception quality of the same information calculated by the mobile station 40a has exceeded the threshold for the reception quality. Therefore, it is possible to reduce control information transmitted from the mobile station 40a to the base station 30a, reduce the traffic of up link radio resources, and suppress the quantity of interference to the entire radio communication system.

<A Configuration of the Radio Communication System according to a Third Embodiment>

Figure 8:
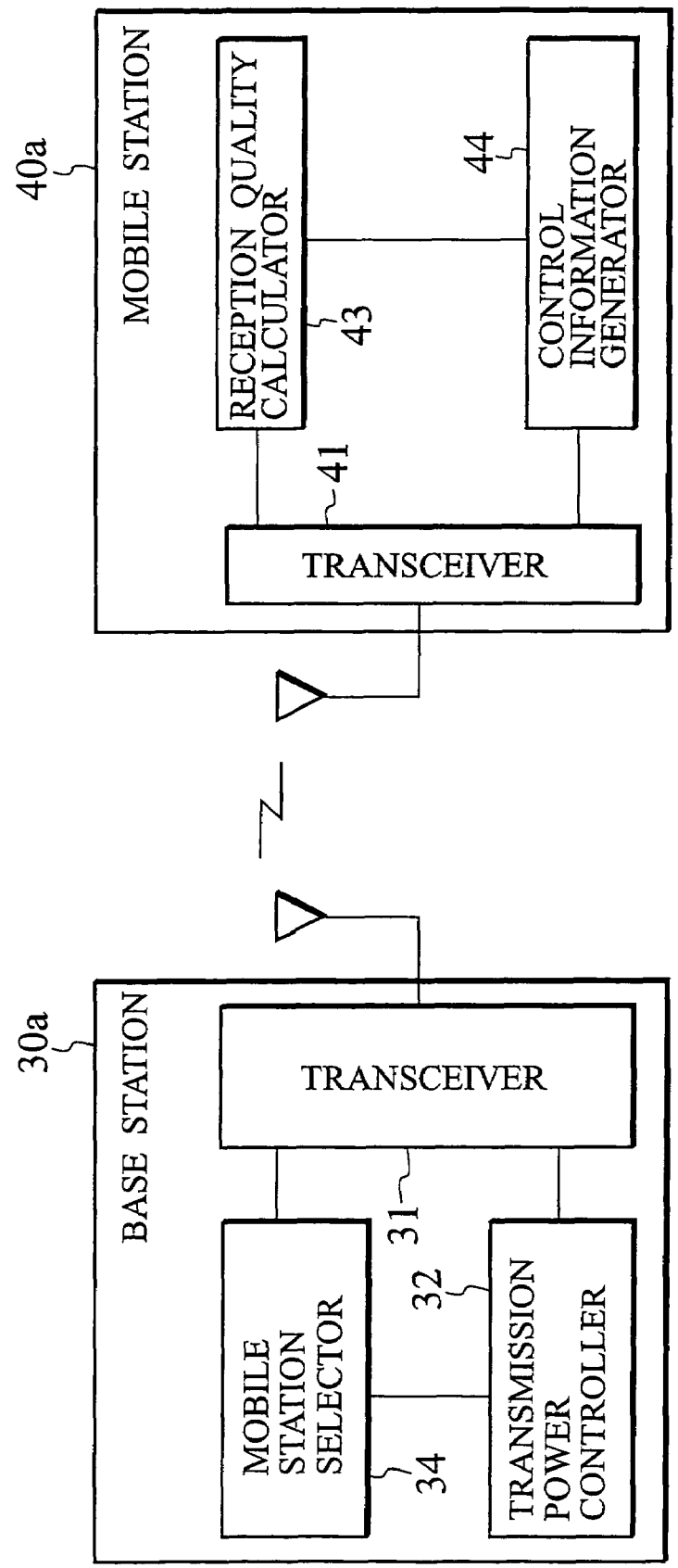
FIG. 8 is a functional block diagram of a base station and a mobile station in the radio communication system according to the third embodiment.

First, configurations of the base station and the mobile station in the radio communication system in a third embodiment will be described with reference to drawing. FIG. 8 is a functional block diagram of a base station and a mobile station in the third embodiment. Hereafter, only points different from the first embodiment and the second embodiment will be described.

As shown in FIG. 8, the base station 30a includes a transceiver 31, a transmission power controller 32, and a mobile station selector 34. The mobile station 40a includes a transceiver 41, a reception quality calculator 43 and a control information generator 44.

The mobile station selector 34 selects a mobile station to which a control information transmission request is transmitted, from among mobile stations (40a to 40c) subordinated to the base station 30a. The mobile station selector 34 selects a specific mobile station or selects a mobile station at random.

In the ensuing description, it is supposed that the mobile station selector 34 has selected the mobile station 40a.

The transceiver 31 is transmission request transmitter for transmitting a control information transmission request to the mobile station 40a selected by the mobile station selector 34.

<An Operation of the Radio Communication System according to the Third Embodiment>

Figure 9:
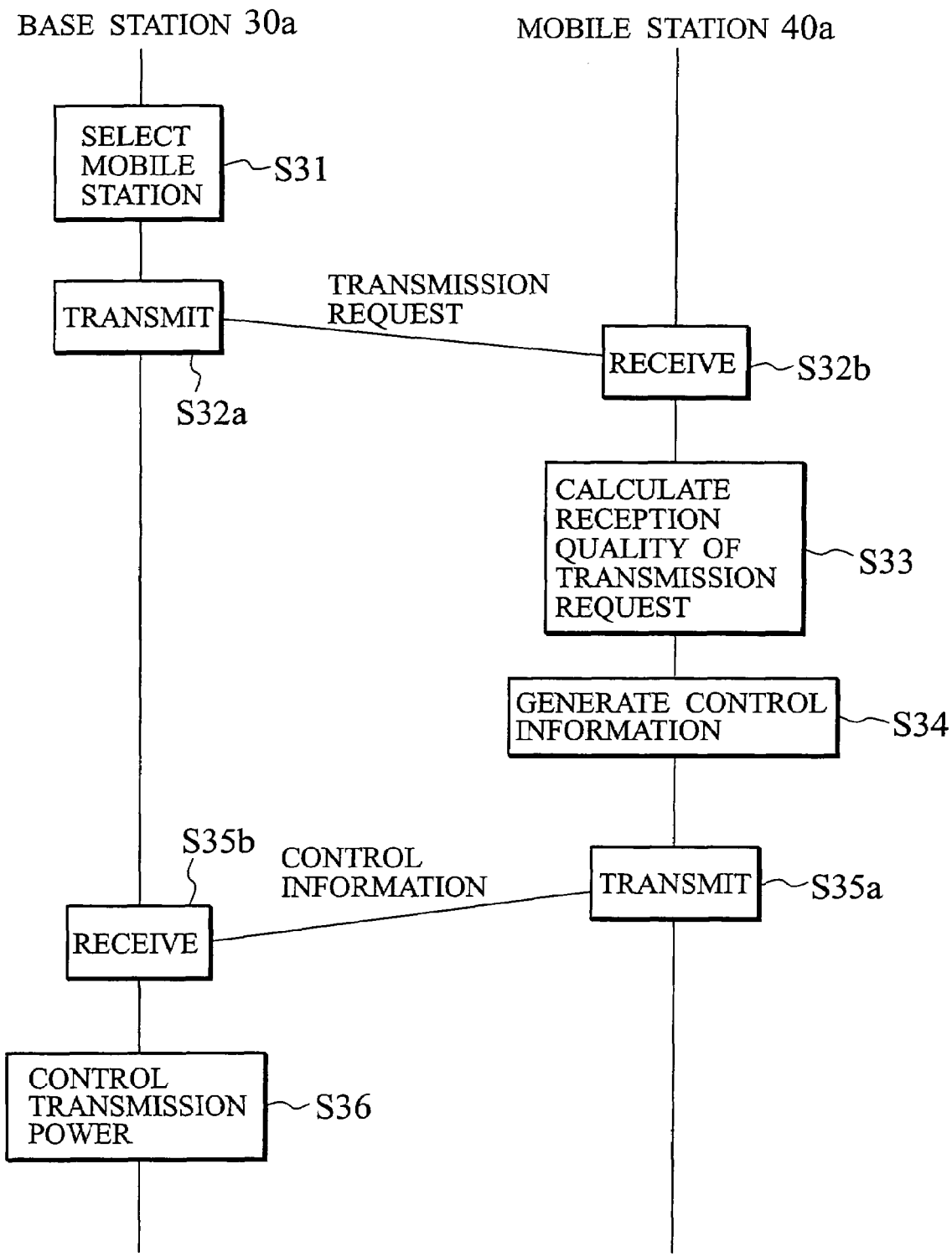
FIG. 9 is a sequence diagram illustrating an operation of a base station and a mobile station in the radio communication system according to the third embodiment.

Operations of the base station and the mobile station in the radio communication system in the third embodiment will be described with reference to drawing. FIG. 9 is a sequence diagram illustrating the operation of the radio communication system in the third embodiment.

As shown in FIG. 9, in step 31, the base station 30a selects a mobile station to which a control information transmission request is transmitted, from among mobile stations (40a to 40c) subordinated to the base station 30a.

In step 32a, the base station 30a transmits a control information transmission request to the mobile station 40a. In step 32b, the mobile station 40a receives the control information transmission request from the base station.

In step 33, the mobile station 40a calculates the reception quality of the control information transmission request received in step 32b.

In step 34, the mobile station 40a generates control information based on the reception quality calculated in step 33.

In step 35a, the mobile station 40a transmits the control information generated in step 34 to the base station 30a. In step 35b, the base station 30a receives the control information from the mobile station 40a.

In step 36, the base station 30a controls down link transmission power based on the control information received in step 35b.

<Functions and Effects of the Radio Communication System according to the Third Embodiment>

According to the radio communication system in the third embodiments, only a specific mobile station selected by the base station 30a or a mobile station selected at random by the base station 30a transmits control information to the base station 30a. Therefore, it is possible to reduce control information transmitted from the mobile stations to the base station 30a, reduce the traffic of up link radio resources, and suppress the quantity of interference to the entire radio communication system.

The present invention can provide a radio communication system, a radio network controller, a mobile station and a down link transmission power control method which makes it possible to reduce control information transmitted from mobile stations to the radio network controller, reduce traffic of up link radio resources, and suppress the quantity of interference to the entire radio communication system.

Additional advantages and modifications will readily occur to those skilled in the art. Therefore, the invention in its broader aspects is not limited to the specific details and the representative embodiment shown and described herein. Accordingly, various modifications maybe made without departing from the spirit or scope of the general inventive concept as defined by the appended claims and their equivalents.

What is claimed is:

1. A radio communication system in which the same information is transmitted from a radio station to a plurality of mobile stations with a predetermined down link transmission power, wherein
    the radio station comprises:
    a transmission power controller configured to control the predetermined down link transmission power based on control information transmitted by the mobile stations, and
    the mobile station comprises:
    a decision unit configured to decide to transmit the control information to the radio station at a predetermined frequency, without using reception quality of the same information transmitted by the radio station when the same information is received by a transceiver; and
    a transmitter configured to transmit the control information to the radio station based on a result of the decision made by the decision unit, the control information being generated according to the reception quality of the same information transmitted by the radio station.

2. A radio communication system in which same information is transmitted from a radio station to a plurality of mobile stations with a predetermined down link transmission power, wherein
    the radio station comprises:
    a mobile station selector configured to randomly select a mobile station to which a transmission request for control information is transmitted;
    a transmission request transmitter configured to transmit the transmission request to the mobile station selected by the mobile station selector; and
    a transmission power controller configured to control the predetermined down link transmission power based on the control information transmitted by the mobile station that has been selected by the mobile station selector, and
    the mobile station comprises:
    a transmitter configured to transmit the control information to the radio station based on the transmission request transmitted by the radio station.

3. A transmission power control method for controlling a predetermined down link transmission power when transmitting same information from a radio station to a plurality of mobile stations with the predetermined down link transmission power, the method comprising:
    deciding to transmit control information from the mobile station to the radio station at a predetermined frequency, without using reception quality of the same information transmitted by the radio station, when the same information is received by a transceiver;
    transmitting the control information from the mobile station to the radio station based on a result of the decision, the control information generated according to reception quality of the same information transmitted from the radio station; and
    controlling the predetermined down link transmission power in the radio station based on the control information transmitted from the mobile stations.

4. A transmission power control method for controlling a predetermined down link transmission power when transmitting same information from a radio station to a plurality of mobile stations with the predetermined down link transmission power, the method comprising:
    selecting, randomly, a mobile station to which a control information transmission request is transmitted in the radio station;
    transmitting the transmission request from the radio station to the selected mobile station;
    transmitting the control information from the mobile station to the radio station based on the transmission request transmitted from the radio station; and
    controlling the predetermined down link transmission power in the radio station based on the control information transmitted from the mobile station.

5. A mobile station for receiving the same information transmitted from a radio station with a predetermined down link transmission power, the mobile station comprising:
    a decision unit configured to decide to transmit control information to the radio station at a predetermined frequency, without using reception quality of the same information transmitted by the radio stations, when the same information pieces are received by a transceiver;
    a reception quality calculator configured to calculate reception quality of the same information transmitted by the radio station, based on a result of the decision made by the decision unit; and
    a transmitter configured to transmit the control information generated based on the reception quality calculated by the reception quality calculator to the radio station.

6. A radio station for transmitting same information to a plurality of mobile stations with a predetermined down link transmission power, the radio station comprising:
    a mobile station selector configured to randomly select a mobile station to which a transmission request for control information is transmitted; and
    a transmission power controller configured to control the predetermined down link transmission power based on the control information transmitted by the mobile station that has been selected by the mobile station selector.

7. A mobile station, comprising:
a decision unit configured to decide to randomly transmit control information to a radio station, without using reception quality of same information which is transmitted from a radio station to a plurality of mobile stations; and
a transmitter configured to transmit the control information to the radio station based on a result of the decision made by the decision unit, the control information being generated according to reception quality of multicast data transmitted by the radio station.

8. A mobile station, comprising:
a decision unit configured to decide to randomly transmit control information to a radio stations, without using reception quality of same information which is transmitted from a radio station to a plurality of mobile stations; and
a transmitter configured to transmit the control information to the radio station based on a result of the decision made by the decision unit.

* * * * *